Oct. 30, 1945.  F. C. HOWARD  2,387,908
WABBLER DRIVE MECHANISM
Filed July 29, 1944  3 Sheets-Sheet 1

INVENTOR.
BY FRANK C. HOWARD
ATTORNEY

INVENTOR.
FRANK C. HOWARD
BY
ATTORNEY

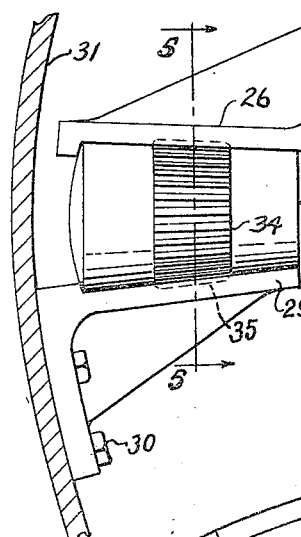
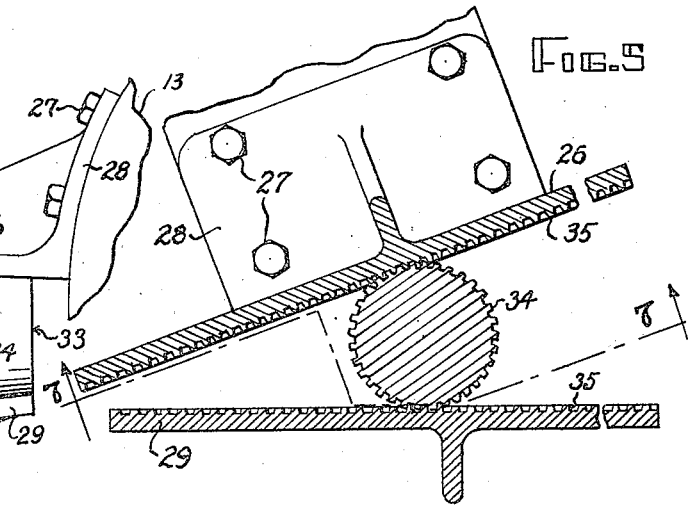
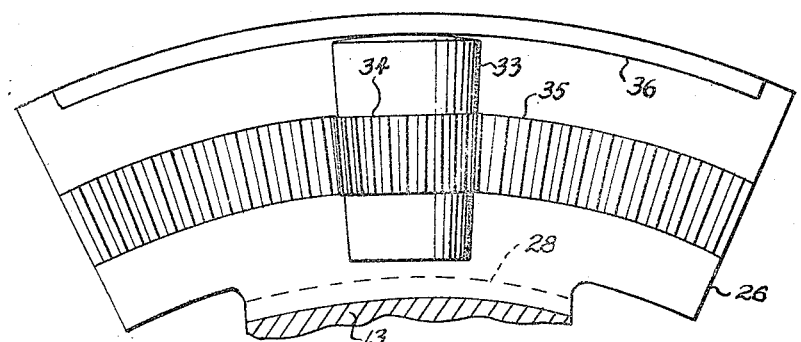
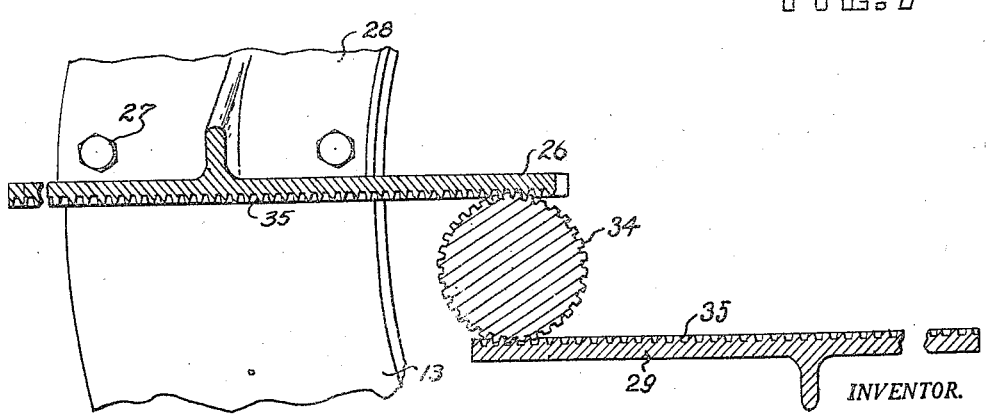

Patented Oct. 30, 1945

2,387,908

UNITED STATES PATENT OFFICE 2,387,908

WABBLER DRIVE MECHANISM

Frank C. Howard, Dearborn, Mich.

Application July 29, 1944, Serial No. 547,267

5 Claims. (Cl. 74—60)

This invention relates to wabbler drive mechanisms such as are suited to the interconversion of reciprocation and rotation in engines, pumps and compressors of a type having cylinders grouped around and parallel to a shaft.

A wabbler, as distinguished from a swash plate, is restrained from participation in rotation of its supporting shaft. The torque reaction of course tends to rotate a shaft-driving wabbler, and a wabbler driven from its supporting shaft obviously tends to participate in the shaft rotation. It has been recognized that points in the inclined mid plane of a wabbler tend to follow the symmetrical path of a spherical lemniscate approximating the form of a figure 8, and material interference with this characteristic motion has been found undesirable, since undue vibration results, particularly at high speeds. A difficult problem is involved in applying restraint against rotation without distorting or destroying the proper lemniscate travel of the point or points where restraint is applied.

An object of the invention is to provide a simple and novel means for restraining a wabbler from rotation without disturbing the characteristic and natural oscillation of the wabbler aforementioned.

Another object is to provide for restraining a wabbler from rotation while maintaining its characteristic movement, such provision being capable of resisting a torque equal to the entire transmitted load.

Another object is to provide readily accessible means for restraining a wabbler from rotation without disturbance of its characteristic movement.

These and various other objects are attained by the construction hereinafter described and illustrated in the accompanying drawings, wherein:

Fig. 4 is an enlargement of a portion of Fig. 2 showing one of the provisions for restraining the wabbler from rotation.

Fig. 5 is a sectional view taken on the line 5—5 of Fig. 4 showing the restraining provision as it appears when its wabbler-carried member is at mid stroke.

Fig. 6 is a sectional view similar to Fig. 5 but showing said wabbler-carried member at a limit of the stroke.

Fig. 7 is a sectional view taken on the line 7—7 of Fig. 5.

Figure 1:
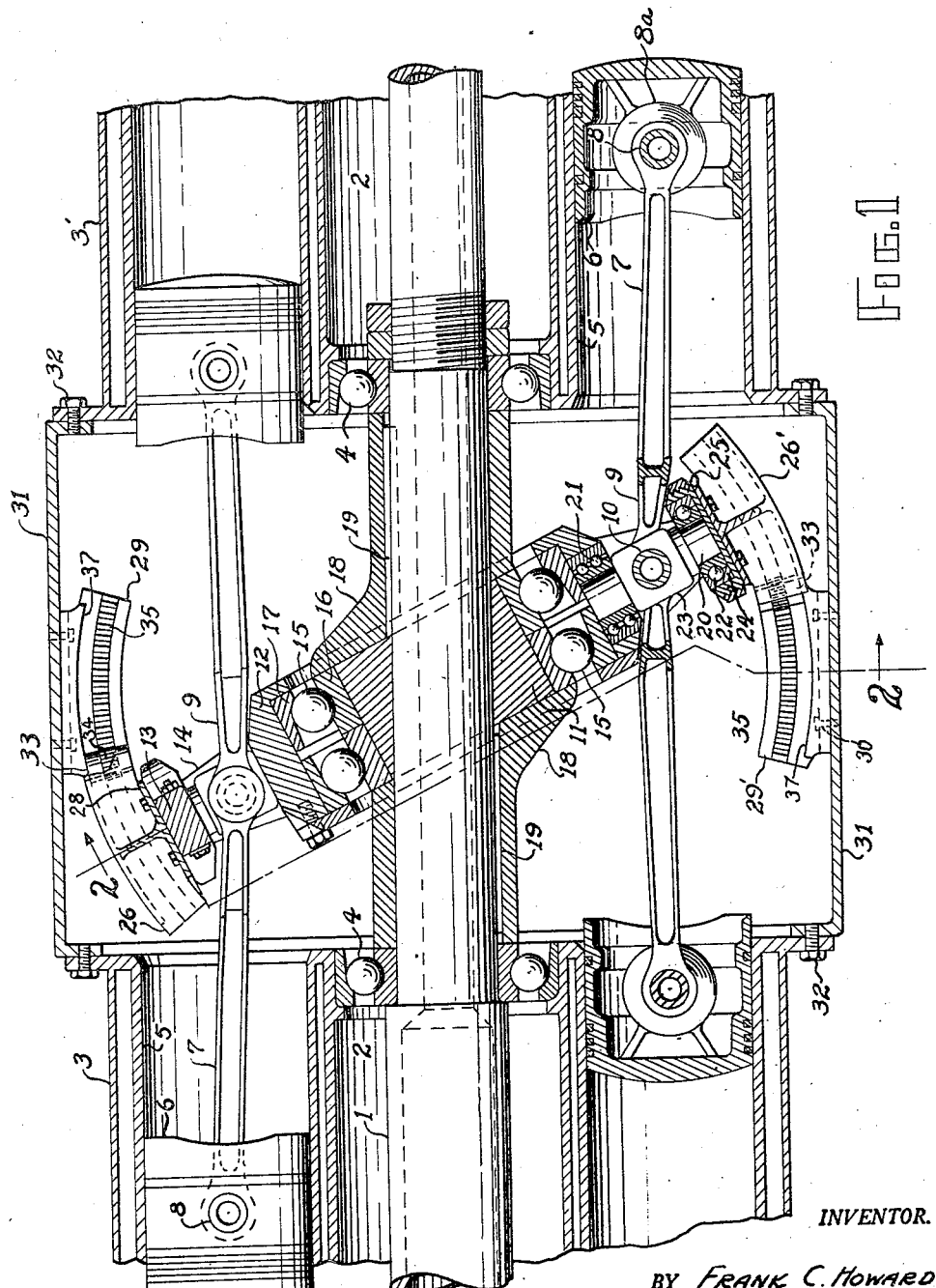
Fig. 1 is an axial sectional view of a wabbler type of engine equipped with my improved means for resisting wabbler rotation, the section being taken on the line 1—1 of Fig. 2.
Figure 2:
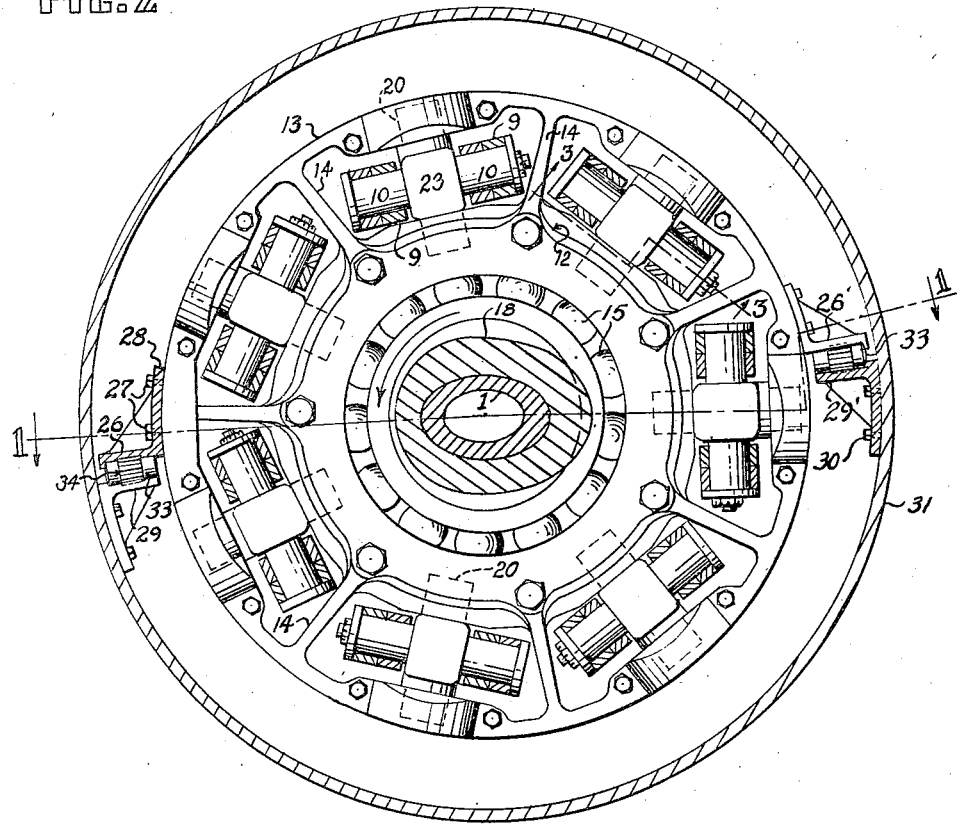
Fig. 2 is a cross sectional view of said engine, taken on the line 2—2 of Fig. 1.

In these views, the reference character 1 designates an engine shaft extending through the central openings 2 of two annular cylinder blocks 3 and 3', coaxial with and spaced longitudinally of said shaft. Said cylinder blocks are supported in any desired manner (not shown) and the shaft is suitably journaled in the blocks, as by anti-friction elements 4. Each cylinder block comprises a like number of cylinders 5, seven being employed in the illustrated construction, as is evident from Fig. 2, such cylinders being equidistant from and parallel to the shaft and accurately opposed in the two blocks. In each cylinder a piston 6 reciprocates and connecting rods 7, swinging on the wrist pins 8 of the pistons and restrained from sliding on said pins by piston bosses 8a, extend freely into the chamber between the two cylinder blocks, and are provided with forked ends 9 within such chamber. The connecting rods of opposed pistons are pivotally interconnected at their forked ends by tubular link pins 10.

Midway between the two cylinder blocks there is installed a wabbler having the necessary diagonal relation to the shaft and journaled on a bearing 11 fixed on and rotative with the shaft, the axis of said bearing being transverse to the mid plane of the wabbler. The wabbler consists of spaced inner and outer rings 12 and 13 and spokes 14 rigidly interconnecting said rings. To mount the wabbler on the bearing 11, there are employed two annular rows of balls 15 set into inner and outer race rings 16 and 17, there being two of each, one for each row of balls. This provides for transmitting rotation-inducing forces from the wabbler to the bearing 11 and shaft with a minimum of friction, said forces being imposed by the connecting rods as will presently appear. For rigidly fixing the bearing 11 on the shaft, a pair of clamping collars 18 are keyed as indicated at 19 to the shaft at opposite ends of the bearing 11 presenting to the latter end faces inclined to conform to the wabbler inclination.

Figure 3:
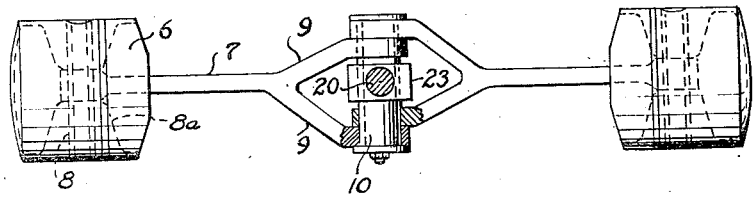
Fig. 3 is a view partially in section on the line 3—3 of Fig. 2, showing two of the opposed engine pistons and their joined connecting rods.

The wabbler is formed between its spokes 14 with openings each accommodating the forked ends of a pair of the opposed connecting rods 7 and also the pin 10 linking such rods together. Disposed transversely to each link pin and radially to the wabbler, is a knuckle pin 20 having its end portions journaled in the inner and outer rings 12 and 13 by anti-friction elements 21 and 22. The mid portion of each knuckle pin is enlarged in the form of a rectangular block 23 disposed between furcations of the paired connecting rods. As best appears in Fig. 3, sufficient play along the link pins 10 is afforded between the blocks 23 and connecting rod forks to provide for such lateral movement as is entailed by lemniscate travel of said blocks.

To facilitate assembly and disassembly it is preferred to mount the outer race rings 24 of the sets of anti-friction elements 22 in nuts 25 set into suitable threaded openings in the outer ring member of the wabbler.

To restrain the wabbler from rotation, its outer member 13 rigidly carries two outwardly projecting plates 26 and 26', occupying a transverse relation to the wabbler, their end portions being similarly extended beyond the wabbler. The exemplified means for securing said plates to the member 13 are cap screws 27 engaging supporting bases 28 for the plates conforming to the outer face of the member 13. Spaced from the plates 26 and 26' in opposite directions circumferential to the wabbler are two similar plates 29 and 29' fixed by cap screws 30 or other suitable fastenings on a cylindrical casing member 31 bolted to the two cylinder blocks, as indicated at 32. Between the plates 26 and 26' and their companion plates 29 and 29' a pair of tapered rollers 33 are installed and are shown diametrically opposed although this relation is not vital. The midportion of each roller is toothed to form a bevel pinion 34, and bevel racks 35 engaged by said pinions are formed on the four plates in suitably spaced relation to the inner and outer margins of the plates. Said racks extend arcuately about the center established by the intersection of the midplane of the wabbler with the shaft axis, the rollers and their pinion teeth being tapered toward the same center, and the plates 26, 26', 29, and 29' being radial to such center. The engagement of the racks and pinions is preferably such as to avoid interfering with free rolling contact between the rollers and plates, the pitch lines of the racks preferably coinciding with the roller-engaging faces of the plates. The taper of the rollers together with their confinement between the plates assures against their shifting inwardly and their outer ends engage elongated shoulders 36 on the plates 26 and 26' and shoulders 37 on the plates 29 and 29' to restrain the rollers from outward shifting.

The described engine operates on the well-known principle of engines of this type, fluid pressure (created preferably by internal combustion) being applied to the pistons in a suitable sequence properly timed to the shaft rotation to continuously oscillate the wabbler and thereby turn the shaft.

As has been stated, my present improvement lies in the provision disclosed for avoiding wabbler rotation without interfering with the characteristic oscillatory motion of the wabbler. In the operation of this provision, one of the plates 29 and 29' fixed on the casing restrains the wabbler from rotation in one direction and the other from reverse rotation. As in most engines, the direction of shaft drive is not intended to vary and hence most of the restraint will be applied by only one of said plates. Thus if the arrow in Fig. 2 indicates shaft rotation (counterclockwise) the torque reaction on the wabbler will be clockwise and will be overcome by the plate 29'. As the wabbler oscillates, the plates 26 and 26' will move reversely in spherical paths extending lengthwise of the fixed plates 29 and 29', and will be parallel to the latter plates in limiting positions of such travel, as best appears in Fig. 6. In moving from either of said limiting positions to a midposition, the plate 26 and 26' will increasingly diverge to the plates 29 and 29', divergency at midposition being a maximum (see Fig. 5). In their described travel, the plates 26 and 26' bear upon and rotate the rollers 33 which roll upon the plates 29 and 29'. Obviously the requisite travel of the rollers is only one-half that of the plates 26 and 26', and the arcuate length of each roller-engaging plate need be only slightly in excess of the roller travel. The intermeshed pinions and racks preferably take none of the torque stresses and serve merely to definitely maintain proper positions of the rollers lengthwise of the plates. In absence of the pinions and racks there might easily be a slippage of the rollers from their intended positions, particularly when divergency of the fixed and moving plates is a maximum (Fig. 5). The rollers may be suited in diameter to the compression stresses under which they must function, provided of course that their diameter is adequate to maintain clearance of the moving and fixed plates when their convergency is a maximum, as in Fig. 5.

It may be desirable in some wabbler mechanisms to use more than the two illustrated provisions for restraining the wabbler from rotation, and it is believed obvious that the number of said provisions employed may be considerably increased if desired. It is to be further noted that my provision for restraining the wabbler from rotation is by no means dependent on the particular mechanism illustrated for effecting oscillation of the wabbler and is equally as applicable to a wabbler driven from its supporting shaft as to the construction illustrated in which the wabbler rotates the shaft.

It is an important feature of the invention that the stresses applied to the rollers are of a compression nature, avoiding any undesirable shear effect. This renders unnecessary any attempt to minimize the wabbler torque reaction, and hence leaves open a wide field of mechanical design in actuating the wabbler.

Numerous wabbler mechanisms patented heretofore include provisions for restraining the wabbler from rotation, but a large majority of such constructions have overlooked the desirability of avoiding interference with the characteristic movement of wabbler points through lemniscate paths. The Almen Patent 2,258,127 accomplishes the purpose without disturbing lemniscate travel, but imposes an undesirable shear on the elements which apply torque restraint to the wabbler. Moreover in the Almen construction, the spaces receiving said elements are so restricted as to materially limit the size of the elements and hence limit the torque forces which said elements may overcome. These objections are eliminated in the construction now disclosed and claimed.

What I claim is:

1. In a wabbler drive mechanism, a shaft, an oscillatory wabbler carried by and diagonally inclined to the shaft, a journal bearing for the wabbler being provided on the shaft with the axis of such bearing transverse to the inclination of the wabbler, a pair of members, one fixed on the wabbler and the other fixed relative to the wabbler, said members being opposed to restrain the wabbler from rotation, and an anti-friction element interposed between said members, and constrained to roll relative to both said members as the wabbler oscillates.

2. A wabbler drive mechanism as set forth in claim 1, said anti-friction element having gear teeth and said members comprising toothed racks intermeshed with said gear teeth.

3. A wabbler drive mechanism as set forth in claim 1, said members being plates substantially radial to the point of intersection of the shaft axis and the journal bearing axis and said anti-friction member being a roller tapered to conform to the relative angularity of said plates.

4. In a wabbler drive mechanism, a shaft, an oscillatory wabbler carried by and diagonally inclined to the shaft, a journal bearing for the wabbler being provided on the shaft with the axis of such bearing intersecting the shaft axis and disposed transversely to the inclination of the wabbler, a casing receiving the wabbler and shaft, a pair of members opposed to restrain the wabbler from rotation, one fixed on and inwardly projecting from said casing and the other fixed on and outwardly projecting from the wabbler, said members being elongated in direction of wabbler oscillation and being convergent in certain of their positions due to such oscillation, and means spacing said members sufficiently apart to maintain their clearance when their relative convergency is a maximum.

5. In a wabbler drive mechanism, a shaft, an oscillatory wabbler carried by and diagonally inclined to the shaft, a journal bearing for the wabbler being provided on the shaft with the axis of such bearing intersecting the shaft axis and disposed transversely to the inclination of the wabbler, a pair of opposed plates for resisting rotation of the wabbler, one fixed on the wabbler and elongated transversely to the wabbler inclination, and the other fixed relative to the wabbler and elongated in a plane approximately radial to the shaft, a roller interposed between and maintaining a spaced relation of said plates, said plates converging substantially toward the point of intersection of the shaft axis and said journal bearing axis and the roller being correspondingly tapered, and a shoulder on at least one of said plates engaged by the outer end of said roller to restrain the roller from outward shifting.

FRANK C. HOWARD.